July 19, 1932.  L. S. CHADWICK  1,867,905
SHAVING EQUIPMENT
Filed July 26, 1930   5 Sheets-Sheet 3

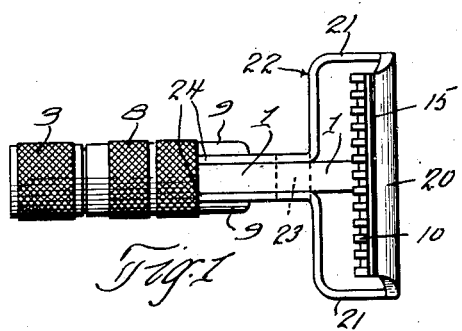
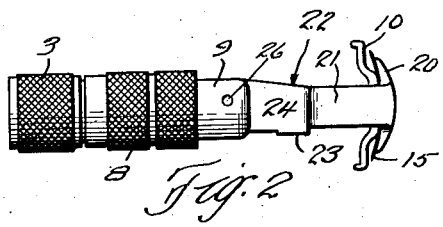
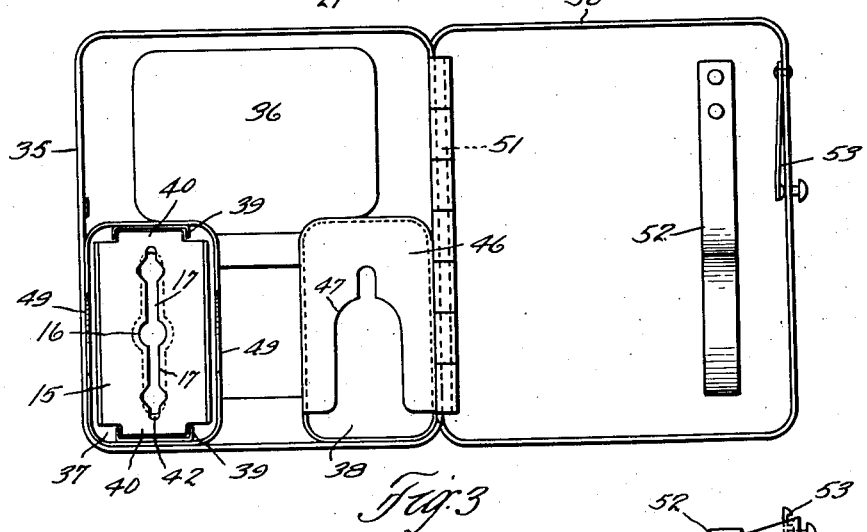
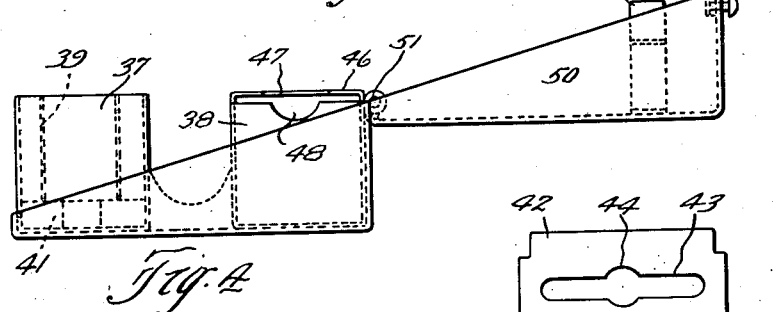
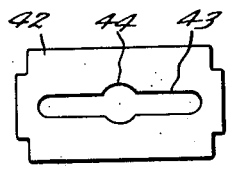
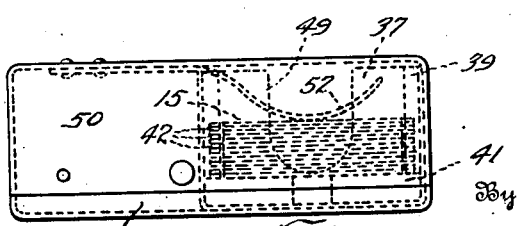

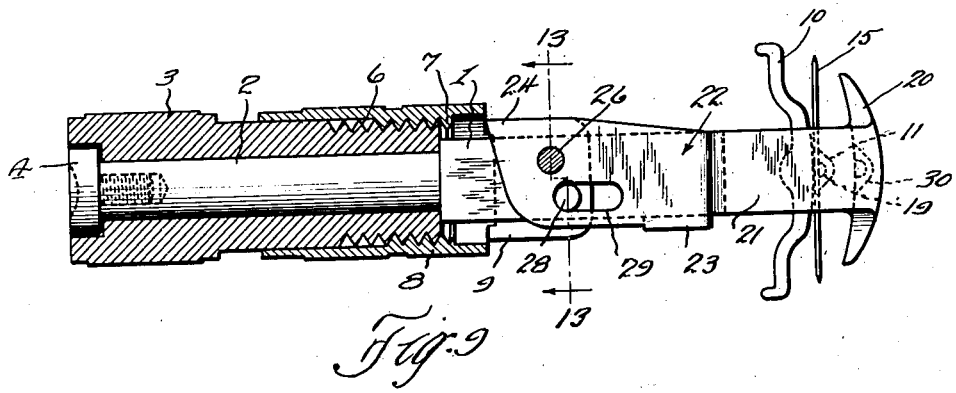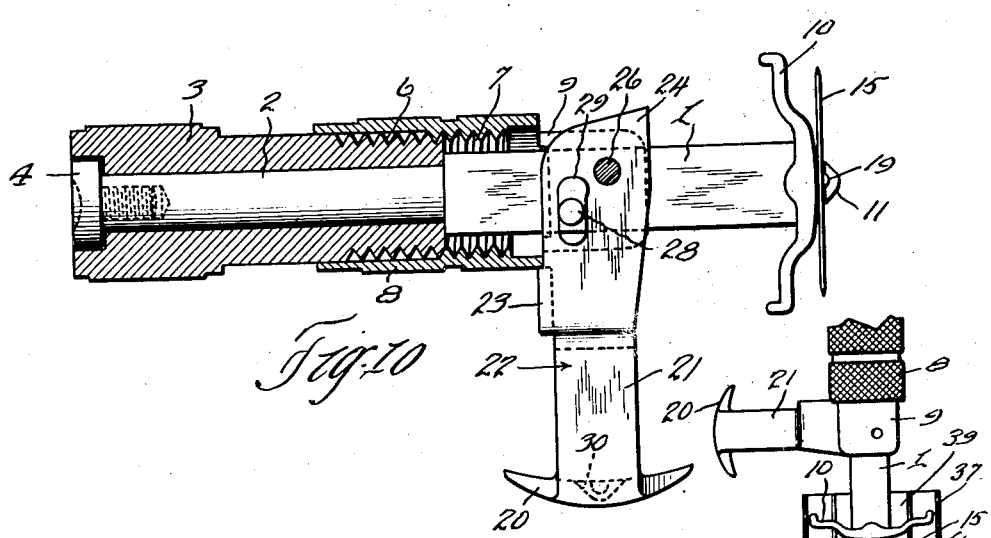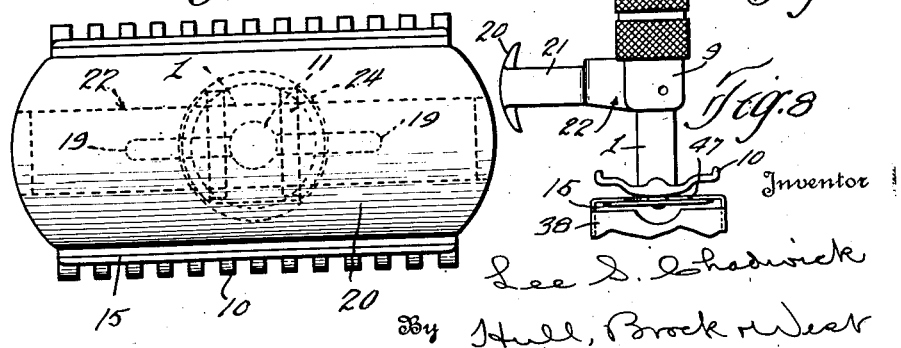

Inventor
Lee S. Chadwick
By Hull, Brock West
Attorneys

July 19, 1932.  L. S. CHADWICK  1,867,905
SHAVING EQUIPMENT
Filed July 26, 1930  5 Sheets-Sheet 4
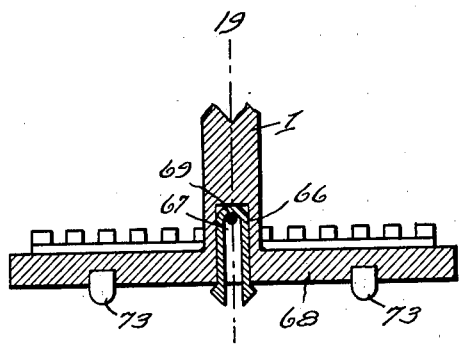
Fig. 18
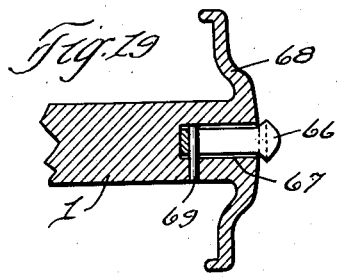
Fig. 19
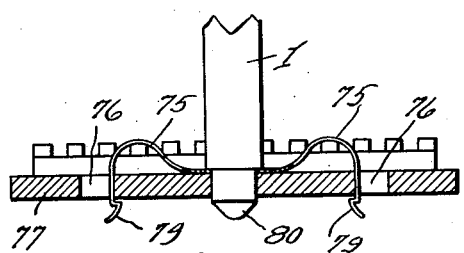
Fig. 20
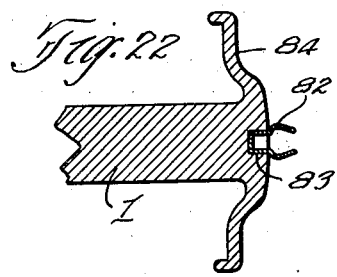
Fig. 22
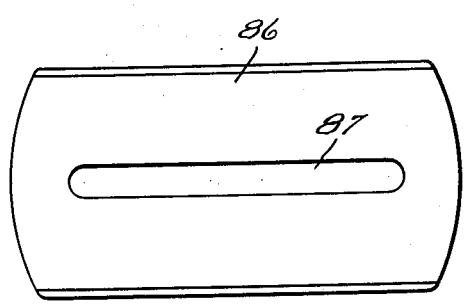
Fig. 23
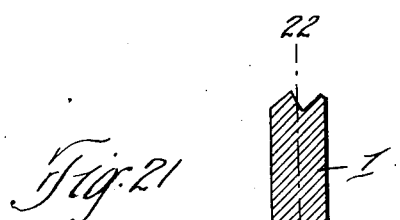
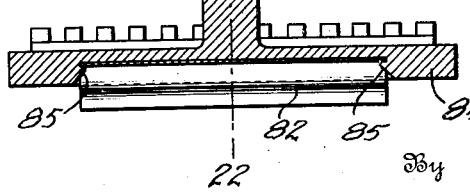
Fig. 21
Inventor
Lee S. Chadwick
By Hull, Brock & West
Attorneys July 19, 1932.  L. S. CHADWICK  1,867,905
SHAVING EQUIPMENT
Filed July 26, 1930  5 Sheets-Sheet 5
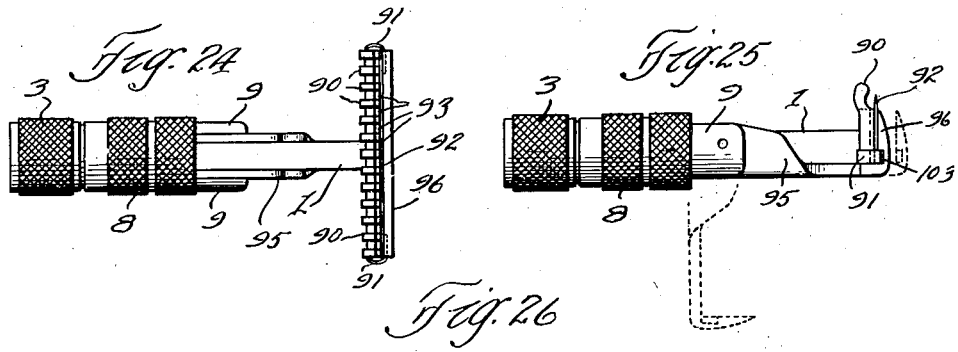
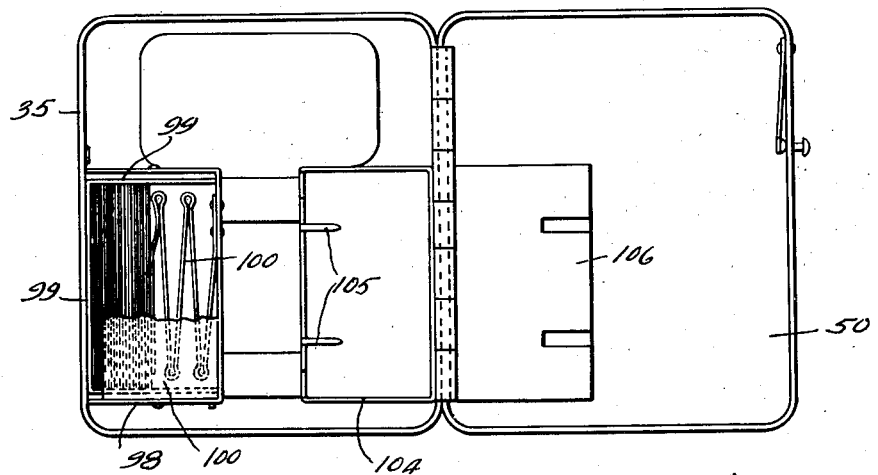
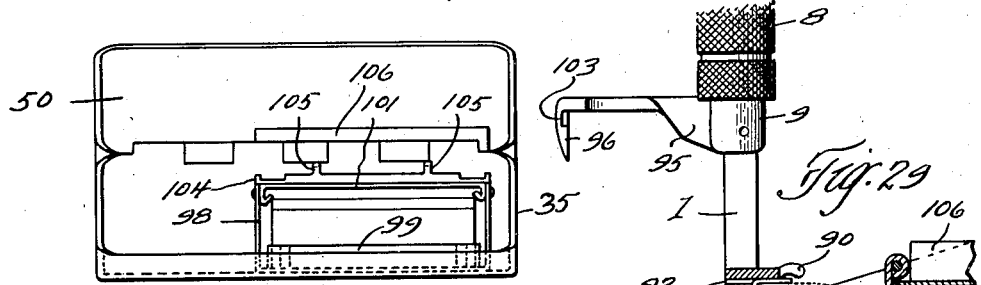
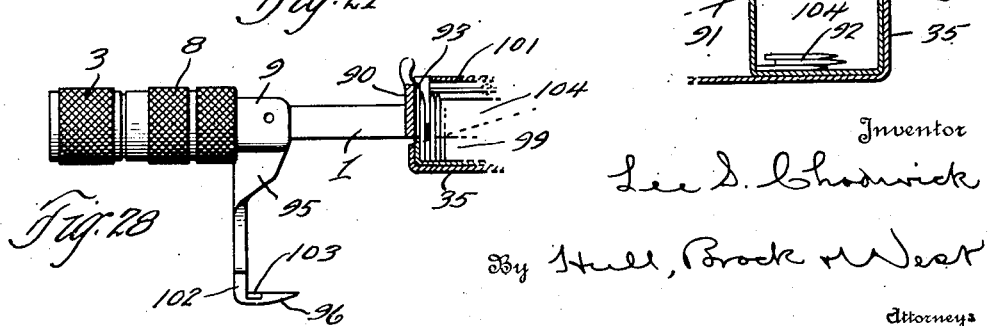
Inventor
Lee S. Chadwick
By Hull, Brock & West
Attorneys Patented July 19, 1932

1,867,905

UNITED STATES PATENT OFFICE

LEE S. CHADWICK, OF SHAKER HEIGHTS, OHIO

SHAVING EQUIPMENT

Application filed July 26, 1930. Serial No. 471,030.

This invention relates to shaving equipment and particularly to safety razors, and its primary purpose is to so improve equipment and devices of this class that their use, especially as it pertains to their care and cleaning and the changing of blades, is very greatly facilitated.

Another object is to provide a safety razor having no detachable parts—excepting the blade—thereby eliminating the usual annoyance of having a number of separate parts to handle with the attendant danger of dropping and damaging them.

Other objects comprehended by the invention are to provide a safety razor to which a blade may be connected in an especially convenient manner without touching the blade with the fingers, and which will clamp the blade properly for shaving, and will hold the blade securely but entirely exposed for rinsing; to provide a razor of this nature in which the blade may be readily adjusted for close shaving or otherwise; to provide a safety razor from which a blade may be disconnected with equal facility without touching the blade with the fingers; and to provide a holding means for blades wherewith the razor cooperates in such manner as to enable the blades to be applied to the razor and/or removed from the razor without the necessity of handling the blades, and which holding means supports fresh blades in such manner that their edges are protected against contact with objects.

Figure 12:
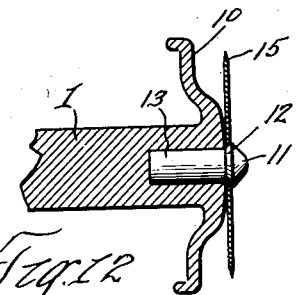
Figure 13:
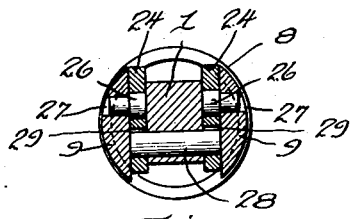
Figure 14:
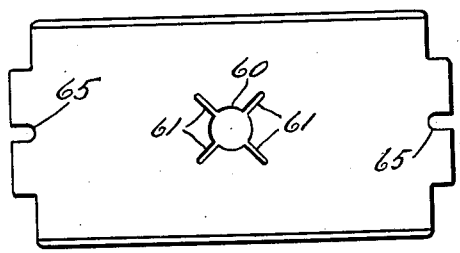
Figure 15:
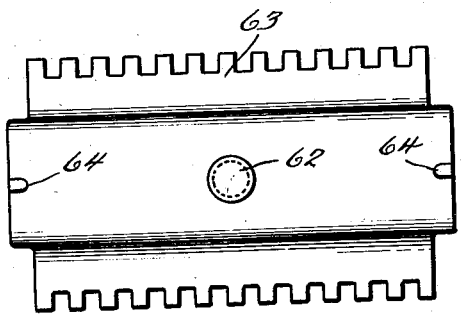
Figure 16:
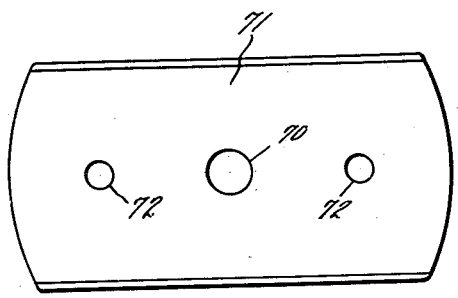
Figure 17:
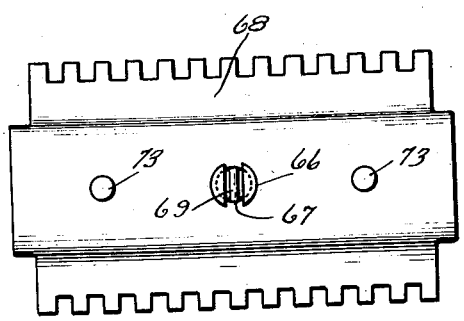

Aims of the invention additional to those above enumerated, including the production of a relatively simple and economical construction for safety razors, will appear as I proceed to describe the invention by reference to the accompanying drawings wherein Figs. 1 and 2 are elevational views, taken at right angles to each other, of my improved safety razor; Fig. 3 is a plan view of a case with the lid open in which the razor may be kept when not in use and incorporating holding means for fresh and used blades and wherewith the razor cooperates for applying fresh blades to the instrument and removing used ones therefrom; Fig. 4 is a side elevation of the case; Fig. 5 is a front elevation of the case with the lid closed; Fig. 6 is a view of one of the separators between adjacent ones of a plurality of which the fresh blades are packed in the case; Figs. 7 and 8 are views illustrating the manner of applying fresh blades to the razor and removing used ones therefrom, respectively; Fig. 9 is a sectional side elevation of the razor with the face plate projected so as to unclamp the blade, this and the succeeding views up to and including Fig. 23 being on a scale considerably enlarged over that of the preceding views; Fig. 10 is a view, similar to Fig. 9, showing the face plate swung to one side to expose the blade; Fig. 11 is an elevation of the face-plate end of the razor; Fig. 12 is a transverse sectional detail through the guard and blade; Fig. 13 is a section on the line 13—13 of Fig. 9; Figs. 14 and 15 are elevational views, respectively, of a modified form of the blade, and the guard of a razor for use therewith; Fig. 16 shows a blade of well known design; Fig. 17 is an elevational view of the guard of a modified form of the razor for use with the blade shown in Fig. 16; Fig. 18 is a longitudinal section of the guard shown in Fig. 17; Fig. 19 is a section on the line 19—19 of Fig. 18; Fig. 20 is a sectional detail of a further modification of the razor for use with the style of blade shown in Fig. 16; Fig. 21 is a view, similar to Fig. 20, of a further modification; Fig. 22 is a section on the line 22—22 of Fig. 21; Fig. 23 is a view of a blade for use with the form of the invention illustrated in Figs. 21 and 22; Figs. 24 and 25 are elevational views at right angles to each other of a modification of the invention in which blades having only one cutting edge are used, these and the following views being on the same scale as Figs. 1 to 8; Fig. 26 is a plan view and Fig. 27 a front view of a case for the present form of the razor and blades; and Figs. 28 and 29 are views showing the methods of applying blades to and removing them from the razor.

Turning now to a detailed description of the invention by the use of reference numerals, 1 designates a post that is rectangular in cross section and on a cylindrical extension 2 of which is rotatably mounted a handle 3. A screw 4, whose head occupies a recess in the outer end of the handle, is screwed into the end of the said cylindrical portion and serves to hold the handle thereon. The inner end of the handle is externally threaded at 6 for cooperation with the internally threaded portion 7 of a surrounding sleeve 8, and extending from the end of said sleeve remote from the handle are opposed cheeks 9 that are spaced from the opposite sides of the post 1.

On the end of the post 1 opposite that on which the handle 3 is mounted, is a guard 10 whose outer surface is generally convexed and of compound curvature, and protruding centrally from the face of the guard is a blade attaching button 11 which is preferably slightly undercut at 12 for a purpose which will presently appear. According to the present embodiment, the button is formed with a shank 13 that is driven into a socket in the end of the post 1, as shown in Fig. 12.

A blade of the style shown in Fig. 3, and designated 15, is intended for use with the form of the invention now under consideration, the same having a central aperture 16 from which slots 17 extend in opposite directions, and it may be explained that the diameter of the aperture 16 is very slightly less than the diameter of the base of the button 11 adjacent the under-cut portion 12 thereof. The blade is adapted to be connected to the razor by forcing the button 11 through the aperture 16, the blade, by reason of the slots 17, yielding to the passage of the button through said aperture, while the resiliency of the blade will cause it to contract about the under-cut portion 12 and thus secure the blade to the button in contact with the adjacent portion of the guard 10. The blade is prevented from turning with respect to the guard by ribs 19 that project from the face of the guard through the slots 17.

A concavo-convexed face plate 20 is carried by the outer ends of arms 21 that form the opposed branches of a yoke-like structure designated generally by the reference numeral 22. The inner ends of the arms 21 are extended inwardly and thence in parallel relation to each other in a direction away from the face plate on opposite sides of the post 1 and between it and the cheeks 9 of sleeve 8, and they are slightly enlarged in a transverse direction and are preferably, though not necessarily, connected together by a cross member 23. The enlarged inner ends of the arms are designated 24 and they are provided with bearing apertures that are occupied by pivot members 26 (Fig. 13) whose reduced outer ends fit within holes 27 in the cheeks 9. Thus it will be seen that the yoke-like structure 22 is pivoted to the sleeve 8 so that it may swing between the positions that are illustrated, respectively, in Figs. 9 and 10. The structure 22 is also pivotally connected, as well as slidably connected, to the post 1 by means of a pin 28 that is extended through a transverse bore of the post and whose ends occupy slots 29 in the enlarged ends 24 of the arms 21, the slots being properly shaped to allow for the desired movement of the yoke-like structure 22, as will clearly appear from a later description of the operation of the device. The inner surface of the face plate 20 is provided with an appropriately shaped recess 30 for the accommodation of the button 11 and the ribs 19.

The case 35, shown in Figs. 3, 4 and 5, contains a compartment 36 for the razor, and holding means or containers 37 and 38 for the fresh and used blades, respectively. The holding means or container 37 is a box-like receptacle by the end walls of which are carried inwardly facing channel members 39 within which loosely fit end extensions 40 of the blades 15. The blades are adapted to be stacked within the container upon a suitable base 41, with separators 42 between adjacent ones thereof. These separators are preferably made of relatively thick waxed paper and one of them is shown in detail in Fig. 6. Each separator has a longitudinal slot 43 that is enlarged at its middle, as shown at 44, the slots 43 and their enlargements 44 of the several separators registering with the slots 17 and apertures 16 of the blades, as clearly indicated in Fig. 3. The holding means or container 8 for the used blades is partially covered by a stripper plate 46 having a notch 47; and as clearly shown in Fig. 4, the end wall of the holding means or container adjacent the open end of the notch 47 is spaced a suitable distance below the plane of the underneath side of the stripper plate and it, too, is notched at 48. The sides of the holding means or container 37 are cut away at 49 to facilitate placement of a stack of blades and separators within the container. A lid 50 is shown as connected by a hinge 51 to one side of the case, and to the inner side of its top is riveted or otherwise secured a spring 52 which is arranged to engage the stack of blades and separators when the lid is closed to prevent their being jostled about in the handling of the case. A latch 53 of any approved form is provided for releasably holding the cover closed.

Figs. 1 and 2 show the razor conditioned for use with the blade clamped between the face plate and the guard, the blade, in the present instance, being deformed to correspond with the concaved inner surface of the face plate. This curvature may be changed by relaxing the face plate slightly through a proper manipulation of the handle 3 to dispose the cutting edges of the blade somewhat further away from the guard and under which conditions a closer shave would be effected.

When it is desired to clean the razor, as after a shaving operation, it is only necessary to turn the handle 3 in a direction to feed the sleeve 8 forwardly along the post 1 which will impart like movement to the yoke-like structure 22, such forward movement continuing until the inner ends of the slots 29 engage the pin 28. The parts are shown in this position in Fig. 9 where it will be seen that the face plate 20 is moved a material distance away from the blade 15, allowing the blade to relax to its normal flat condition, in which condition it withdraws from all but a very small part of the outer surface of the guard 10. With the parts in this condition, the razor may be rinsed thoroughly and the water shaken from the blade and the adjacent parts of the razor. Unless the blade is to be changed, the handle may be turned to feed the sleeve 8 inwardly and retract the face plate and again clamp the blade between the latter and the guard; and in this condition the razor may be placed within the case 35 in readiness for a subsequent shaving operation.

When it is desired to discard a used blade and apply a fresh one to the razor, the handle 3 is turned to first project the face plate, as above described and as illustrated in Fig. 9, and then, by continued turning, to extend the sleeve 8 forwardly a greater distance than before along the post 1 so as to carry the pivot members 26 forwardly beyond the pin 28, thereby to cause the yoke-like structure 22 to swing about said pin to the position shown in Fig. 10. With the parts in this condition, the blade 15 is completely exposed with no obstructions about the ends of the guard 10, so that now one end of the blade 15 may be inserted beneath the free end of the stripper plate 46 that partially covers the blade holding means or container 38 while the guard 10 is moved laterally above or across the upper surface of the stripper plate (Fig. 8), the notch 48 in the end wall of the container and the notch 47 in the stripper plate accommodating the button 11. When the blade is entirely within the container, the razor may be lifted to strip the blade from the button 11 and the used blade, thus disconnected from the razor, will drop within the container. The razor is then applied to the top blade of the pack in the holding means or container 37 and the button 11 is forced through the central aperture 16 thereof (Fig. 7). The resiliency of the blade will cause it to connect itself with a snap action, similar to the action of a snap fastener or glove button, to the button 11 of the razor, the ribs 19 entering the slots 17 of the blade to prevent the latter from turning with respect to the razor. Now by turning the handle 3 in a direction to feed the sleeve 8 rearwardly along the post 1, the yoke-like structure 22 is caused to swing into alignment with the post with the face plate 20 in confronting relation to the guard 10, and continued rotation of the handle in the same direction will draw the parts together to clamp the blade between the face plate and guard, as shown in Fig. 2.

Thus it will be seen that my invention provides shaving equipment that makes it unnecessary to touch the blades in applying them to or removing them from the razor, and that it is not necessary to remove any parts from the razor for the purpose of thoroughly rinsing it.

The blade 59 shown in Fig. 14, which is intended for use with the guard 68 shown in Fig. 15, has a central aperture 60 from which slots 61 radiate. The portions between the slots constitute spring tongues which yield to the projection of the button 62, on the guard 63, through the opening 60. In this case, the blade is held against turning with respect to the guard by lugs 64 on the guard that engages within notches 65 in the ends of the blade.

In both forms of the invention thus far described, the button which is carried by the guard is rigid and the blade is so constructed that it will yield as the button is projected through its aperture. In the remainder of the modifications of the invention which I have herein disclosed, the attaching means for connecting the blade to the guard is of a yielding character. In the construction illustrated in Figs. 17, 18 and 19, a U-shaped spring member 66 occupies a socket 67 in the end of the post 1 that opens through the outer surface of the guard 68, the same being shown as held in place by a pin 69. The outer ends of the branches of the U-shaped member are shaped to approximate a button adapted to be projected through the central aperture 70 of the blade 71 that is shown in Fig. 16. This blade is of a well known style and has holes 72 between the central aperture 70 and the ends of the blade, and these holes are occupied by studs 73 when the blade is applied to the guard 68.

The same blade 71 may be used with the form of the invention illustrated in Fig. 20 where the ends of a spring member 75 project through openings 76 in the guard 77 and are formed with hooks 79 that are adapted to be engaged through the holes 72 of the blade when the button 80 is projected through the aperture 70 of the blade. The button 80 is shown as formed by the reduced and tapered end of the post 1, said end being extended through a hole in the spring member 75 and driven through an opening in the guard with the spring member 75 clamped between the inner face of the guard and the opposed surface of the body of the post 1.

In the form of the invention illustrated in Figs. 21 and 22, a spring member 82, generally in the form of a channel, is set within a groove 83 that is formed in and lengthwise of the outer surface of the guard 84, and the member is shown as held against withdrawal from said groove by having the end walls of the groove peened over the ends of the web of the channel member as shown at 85. A blade 86 of special form, having a longitudinal slot 87, and shown in Fig. 23, is intended for use with this modification of the invention, and the blade is attached to the guard 84 by projecting the bulged outer portion of the member 82 through the slot 87, the side flanges of the member yielding to permit of such action.

Appropriately shaped separators, having the same purpose as those hereinbefore described, are intended to be used with the blades shown in Figs. 14, 16 and 23, and the blade holding means or containers 37 and 38 may be reconstructed to better meet the requirements of said blades, but such alterations are so obvious that illustration thereof is deemed unnecessary.

In the form of invention illustrated in the views starting with Fig. 24, blades of the kind having only one cutting edge are used. In describing the present modification, the parts thereof that are substantially identical with parts of the previously described form will be designated by the same reference characters. Carried by the forward end of the post 1 is a guard 90. Extending over the ends of the guard adjacent the rear edge thereof are spring clips 91, between whose free ends and the adjacent surface of the guard a blade 92 is adapted to be held. The front face of the guard is grooved from front to rear, as indicated at 93, for purposes which I will presently explain.

Pivotally connected to the cheeks 9 of the sleeve 8, and slidably as well as pivotally connected to the post 1, is a member 95 which corresponds to the yoke-like structure 22 of the previous forms of the invention, the connections between the member, post and sleeve being the same as in the former cases, and carried by the free end of the member 95 is a face plate 96. As in the foregoing instances, by turning the handle 3, the sleeve 8 is reciprocated along the post 1 to swing the member 95 between a position wherein the face plate is in confronting relation to the guard and a position wherein the face plate is to one side of the guard. In the action of the member 95 the face plate is first moved away from the guard in parallel relation thereto, as indicated in dotted lines in Fig. 25, and then swung to the side, as also indicated in dotted lines in Fig. 25 and as shown in full lines in Figs. 28 and 29.

A plurality of fresh blades of the kind now under consideration are adapted to be arranged side by side within a holder 98 in the case 35 (Figs. 26 to 29), the blades being retained in proper position by a frame member 99 toward the front side of which the blades are urged by a spring 100. A cover 101, which is normally closed, extends from the rear side of the holder 98 to within a short distance of the forward side thereof so that the guard 90 of the razor, when the member 95 is swung to one side, may be drawn down across the forward blade with the clips 91 engaged about the ends thereof. The razor is depressed until the guard is stopped by the upper edge of the frame member 99, and when the razor is lifted from the case, the blade will be withdrawn from the holder. Now, when the handle 3 is manipulated to swing the member 95 back to normal position, the flanged rear edge 102 of the face plate 96 will engage the rear edge of the blade and push the blade into proper position with respect to the guard, and when the member 95 is retracted the blade will be clamped between the face plate 96 and the guard 90. The ends of the inner surface of the face plate 96 are notched at 103 for the accommodation of the clips 91.

When it is desired to remove used blades from the razor, the member 95 is swung to the side and the razor is moved across the top of a holder or receiver 104 and prongs 105 that extend rearwardly from the forward side of said receiver engage within certain ones of the grooves 93 of the guard and withdraw the blade from the clips 91 so as to free it and allow it to fall into the receiver or holder. When the lid 50 of the case 35 is closed, a member or block 106 that is carried by the lid fits over and serves to close the open top of the receiver 104 so as to prevent the used blades from falling out of the receiver when the case is jostled about. Besides the grooves 93 accommodating the prongs 105 during the blade removal operation, they also facilitate the rinsing of the blade.

Having thus described my invention, what I claim is:

1. A razor comprising a body portion incorporating a handle and a guard, an element slidably and swingably carried by the body portion and including a face plate that is movable with said element toward and from the guard in confronting relation thereto and is swingable with said element to one side and to the rear of the guard, actuating means incorporated in the handle of the razor for progressively sliding and swinging the element, and a blade adapted to be disposed between the face plate and guard when they are in confronting relation.

2. A razor comprising a post, a guard carried by one end of the post, a member movable longitudinally of the post, an element pivoted to said member and operatively connected to the post whereby the movement of the member along the post swings said element, a face plate carried by the element and swingable therewith between a position confronting the guard and a position to one side and to the rear thereof, and a blade adapted to be disposed between the guard and face plate when they are in confronting relation.

3. A razor comprising a post, a guard carried by one end of the post, a handle movably carried by the opposite end of the post, a member shiftable longitudinally of the post and having operative connection with the handle so as to be actuated thereby, an element pivotally connected to said member and having operative connection with said post so that it is swung with respect to the post when the member is shifted, a face plate carried by the element and swingable therewith between a position in confronting relation to the guard and positioned to one side and to the rear thereof, and a blade adapted to be disposed between the face plate and guard when they are in confronting relation.

4. A razor comprising a post, a handle rotatably mounted on one end of the post, a guard carried by the opposite end of the post, a member shiftable longitudinally of the post and having an operative connection with the handle so as to be actuated thereby when the handle is rotated, an element pivoted to said member and having operative connection with the post so as to be swung on its pivotal axis when the member is shifted, a face plate carried by the element and swingable therewith between a position in confronting relation to the guard and a position to one side and to the rear thereof, and a blade adapted to be disposed between the guard and face plate when they are in confronting relation.

5. A razor comprising a post, a handle rotatably mounted on one end of the post, a guard carried by the opposite end of the post, a sleeve encircling the post and handle and having a screw thread connection with the latter whereby the sleeve is moved longitudinally of the post upon rotation of the handle, said sleeve being non-rotatable with respect to the post, a structure having pivotal connection with the sleeve and operatively connected to the post so as to be swung with respect to the post when the sleeve is actuated by the handle, a face plate carried by said structure and swingable therewith between a position in confronting relation to the guard and a position to one side and to the rear thereof, and a blade adapted to be disposed between the face plate and guard when they are in confronting relation.

6. A razor comprising a post, a handle rotatably mounted on one end of the post, a guard carried by the opposite end of the post, a sleeve encircling the post and handle post, and having screw thread connection with the latter so as to be moved longitudinally of the post upon rotation of the handle, said sleeve having opposed cheeks extending from its end toward the guard on opposite sides of and in spaced relation to the post, a yoke-like structure having one end of its opposed branches situated between the opposite sides of the post and the adjacent cheeks, means pivotally connecting said ends to the cheeks, said ends having slots, pivotal means extending from the post into said slots, a face plate carried by the free ends of the branches of the yoke-like structure and adapted to be moved therewith toward and from the guard in confronting relation thereto and swingable therewith out of confronting relation to the guard and to the rear thereof, and a blade adapted to be disposed between the face plate and guard when they are in confronting relation.

7. A razor comprising a post, a handle rotatably mounted on one end of the post, a guard carried by the opposite end of the post, a sleeve encircling the post and handle and having screw thread connection with the latter so as to be moved longitudinally of the post upon rotation of the handle, said sleeve having opposed cheeks extending from its end toward the guard on opposite sides of and in spaced relation to the post, a yoke-like structure having one end of its opposed branches situated between the opposite sides of the post and the adjacent cheeks, means pivotally connecting said ends to the cheeks, said ends having slots, pivotal means extending from the post into said slots, a face plate carried by the free ends of the branches of the yoke-like structure and adapted to be moved therewith toward and from the guard in confronting relation thereto and swingable therewith out of confronting relation to the guard and to the rear thereof, and means for detachably connecting a blade to the guard.

8. A razor incorporating non-separable but relatively movable parts between which a blade is adapted to be disposed, one of said parts having a stud and a protruding positioning means, the other part being recessed to accommodate the stud and positioning means, the parts when moved away from each other leaving an unobstructed space for the insertion of a blade between them, and a blade apertured for the reception of the stud and positioning means, the aperture being so shaped as to render the material of the blade surrounding the aperture resilient whereby it is caused to cling to the stud when the latter is forced through the aperture.

9. A razor incorporating two non-separable but relatively movable parts between which a blade is adapted to be disposed, an elongated expanding spring member carried by one of said parts for holding engagement with a blade only, the other part being formed for the accommodation of said spring member, and a blade adapted to be disposed between said parts and having a slot for the reception of the expanding spring member.

10. A razor incorporated two non-separable but relatively movable parts, a blade disposed between said parts and having a central aperture and holes located between said aperture and the ends of the blade, one of said parts having a projection that is arranged to be received by said aperture, and an elongated spring member carried by one of said parts whose ends are adapted to be engaged through the holes of the blade, said ends being so shaped as to coact with the blade for holding it to the part by which said spring member is carried.

11. In combination, a razor body incorporating a guard, a plurality of resilient blades for use therewith that are supported separately from said body, the body having a non-yielding blade holding projection and each blade having an aperture for the reception of said projection and of such nature as to render the blade capable of flexing in the region of the aperture, the projection and blade being designed to interengage with a gripping action for detachably connecting the blade to the body, means for holding said plurality of blades so that a blade may be connected to the razor body by presenting the latter to the former for the purpose of interengaging the aforesaid projection with the aperture of the blade, and guiding means in conjunction with the blade holding means adapted to cooperate with the outside edges of the guard to cause the guard to properly register with the blades when the former is presented to the latter.

12. In combination, a razor body, a plurality of blades with each of which the razor body is capable of having a slip joint connection, said connection yielding to force incident to the application or removal of a blade, means for holding a stack of blades spaced one from another and so that the end blade of the stack is in a position to be applied to the razor body by the application of the latter thereto, a receiver for the blades, and stripper means associated therewith for removing the blades from the razor body.

13. In combination, a razor body having a blade attaching projection, a plurality of apertured blades for use therewith and with the aperture of each of which the projection on the razor body is adapted successively to have a frictional detachable connection, a holder for used blades, and means associated therewith for removing the blades from the razor body.

14. In combination, a razor body having a blade attaching projection, a plurality of apertured blades for use therewith and with each of which the projection on the razor body is adapted successively to have a slip joint connection, a container for used blades, and a stripper means associated therewith whereby the blades may be removed from the razor body and deposited in said container.

15. In combination, a razor body having a blade attaching projection, a plurality of apertured blades for use therewith, the projection on the razor body being adapted successively to have a slip joint connection with the aperture of each blade, a container for used blades, and a stripper plate partially covering the container and cooperating with the blade to remove it from the razor and deposit it within the container when the razor body with the blade is presented in operative relation thereto, said stripper plate being cut away to accommodate said projection.

16. In combination, a razor body and a plurality of blades for use therewith, the razor body having a projection and each blade an aperture for the reception of said projection, the parts being of such nature that a slip joint connection is effected between the razor body and blade through the instrumentality of said projection, a container for used blades, and a stripper means associated therewith which serves to remove the blade from the projection and deposit it within the container when the razor body and blade are presented in operative relation thereto.

17. A razor comprising a body portion incorporating a guard, spring clip means for holding a blade to the guard, the surface of the guard against which the blade is adapted to be held being grooved, a face plate non-detachably connected to the body portion and between which and the guard the blade is adapted to be clamped, and means adapted to be accommodated by the grooved surface of the guard for removing blades from the guard when held therein by said spring clip means.

18. A razor comprising a body portion incorporating a guard, spring clips extending about the ends of the guard, and a face plate adapted to be swung to one side and to the rear of the guard, and non-detachably connected to the body portion and between which and the guard the blade is adapted to be clamped, said face plate having recesses for the accommodation of said spring clips.

19. In combination with a self-contained razor incorporating a guard, and spring clips at the ends thereof, a holder apart from the razor for a plurality of blades that are arranged side by side, said holder supporting the blades so that the razor may be presented to the end blade in such manner as to engage it between the guard and clips, and further means non-separably attached to the razor for clamping the blade to the guard.

20. In combination with a razor incorporating a guard, and spring clip means for holding a blade to the guard, a receiver for used blades having means for engaging a blade and withdrawing it from the guard when the razor is presented in proper relation thereto.

21. In combination with a razor incorporating a guard, and spring clips at the ends thereof for holding a blade to the guard, the surface of the guard against which the blade is adapted to be held being transversely grooved, a receiver for used blades having means for cooperation with the grooved surface of the guard for removing a blade from the guard when the razor is presented in operative relation to the receiver.

22. A razor comprising a body portion incorporating a unit consisting of a guard, a second unit consising of a face plate that is non-detachably connected to the body portion and is movable toward and from the first mentioned unit and to one side and to the rear thereof, a blade, and friction means associated with one of said units for initially attaching the blade thereto.

23. A razor comprising a body portion incorporating a unit consisting of a guard, a second unit consisting of a face plate that is non-detachably connected to the body portion and is movable toward and away from the first mentioned unit and to one side and to the rear thereof, a blade, and spring gripping means associated with one of said units for attaching said blade thereto.

24. A razor comprising a body portion incorporating a guard, a face plate movable between a position confronting the guard and a position to one side and to the rear thereof so as to fully expose the guard, means for moving the face plate between said positions, a blade, and means for detachably connecting said blade to the guard when the latter is exposed, the blade being adapted to be clamped between the guard and face plate when they are in confronting relation.

25. A razor comprising a body portion incorporating a guard, a face plate movable between a position confronting the guard and a position to one side and to the rear thereof so as to fully expose the guard, means for moving the face plate between said positions, a blade, and friction means for attaching said blade to the guard when the latter is exposed, the blade being adapted to be clamped between the guard and face plate when they are in confronting relation.

26. A razor comprising a body portion incorporating a guard, a face plate movable between a position confronting the guard and a position to one side and to the rear thereof so as to expose the guard, means for moving the face plate between said positions, a blade, spring gripping means for detachably connecting said blade to said guard when the latter is exposed, the blade being adapted to be clamped between the guard and face plate when they are in confronting relation.

27. A razor comprising a body portion incorporating a guard, a face plate movable between a position in confronting relation to the guard and a position to one side and to the rear thereof to fully expose the guard, means operatively connecting the face plate to the body portion in such manner as to positively restrict the face plate to such a course of movement, an actuator carried by the body portion for moving the face plate, and a blade adapted to be applied to the guard when exposed and to be clamped between it and the face plate when the face plate and guard are in confronting relation.

28. A razor comprising a body portion incorporating a guard, an element slidably and pivotally connected to the body portion and including a face plate that is movable toward and from the guard by the sliding of the element and that is swingable with said element between a position in confronting relation to the guard and a position to one side thereof to fully expose the guard and leave it entirely unobstructed for the application of a blade thereto, means carried by the body portion for so sliding and swinging the element, and a blade adapted to be applied to the guard when exposed and to be disposed between the face plate and guard when they are in confronting contiguous relation.

29. In combination, a razor body and a plurality of resilient blades for use therewith that are supported separately from said body, the body having a rigid stud and each blade having an aperture for the reception of said stud that is of such a nature as to render the blade capable of flexing in the region of the aperture, the stud and blade being designed to interengage with a gripping action for detachably connecting the blade to the body, and means for holding said plurality of blades so that a blade may be connected to the razor body by presenting the latter to the former for the purpose of interengaging the aforesaid stud with the aperture of the blade.

30. In combination, a razor body incorporating a rigid stud, a plurality of resilient blades, each blade having an aperture of such nature that the blade is capable of yielding in the region thereof and wherewith said stud is adapted to have a slip joint connection, and means for holding said plurality of blades in a stack apart from said body so that the end blade of the stack is in a position to be applied to the razor body by the application of the latter thereto.

31. In combination, a razor body, a plurality of flexible blades for use therewith, the body having a rigid projection and each blade having an aperture for the reception of said projection that is of such a nature that the blade is capable of yielding in the region of the aperture when the projection is inserted therethrough, means for holding a stack of blades with the end blade of the stack in position to receive the projection when the razor body is presented in operative relation to the blade, and spacers between adjacent blades of the stack, said spacers having apertures registering with the apertures of the blades.

32. A razor comprising a body portion incorporating a guard fixed with respect thereto and that is otherwise than straight, a face plate non-detachably connected to the body portion and movable toward and from the guard and to one side and to the rear thereof, a flexible steel blade adapted to conform to the shape of the guard, and actuating means associated with the body portion for moving the face plate as aforesaid and for positively guiding it in its movements thereby preventing the face plate from contacting with the cutting edges of the blade when the face plate is moved to one side of the guard and to the rear thereof.

33. In combination, a razor body, a plurality of blades with each of which the razor body is capable of having a slip joint connection, said connection yielding to force incident to the application or removal of the blade, means for holding a stack of blades so that the end blade of the stack is in a position to be applied to the razor body by the application of the latter thereto, a receiver for the blades, and stripper means associated therewith for removing the blades from the razor body.

34. A razor comprising a body portion incorporating a guard, a face plate movable between a position confronting the guard and a position to one side and to the rear thereof to fully expose the guard, means carried by the body portion for positively moving the face plate between said positions and serving to sustain it in any position to which it is moved, a blade adapted to be applied to the guard when exposed and to be disposed between the guard and face plate when they are in confronting relation, and further means for initially positioning and attaching the blade to the guard while the latter is exposed preparatory to moving the face plate into confronting relation therewith through the instrumentality of the first mentioned means.

35. In combination, a blade holding receptacle, a razor separate therefrom comprising a body portion involving a guard and having blade positioning means that is adapted to be inserted into said receptacle for the self-positioning and self-attachment of a blade thereto, pick-up means on the guard for initially attaching the blade to the guard, a face plate operatively connected to the body portion so as to be capable of sufficient travel longitudinally thereof to clear the cutting edge of a blade sustained by the guard and sufficient travel laterally of and to the rear of the guard to leave the same exposed for an unobstructed entrance into the blade holding receptacle, and actuating means carried by the body portion for imparting the aforesaid travel to the face plate and for so disposing it with respect to the guard as to clamp the blade between the face plate and guard.

36. A razor comprising a body portion incorporating a unit consisting of a guard, a second unit consisting of a face plate that is non-detachably connected to the body portion and is movable in an orbit having a fixed relation to the body portion toward and from the first mentioned unit and to one side and completely to the rear thereof, a blade having an opening, one of said units having a protuberance for entering said opening with sufficient frictional contact with the sides thereof to fasten the blade to the last mentioned unit, the other unit having a recess for the accommodation of said protuberance, and actuating means carried by the body portion of the razor for effecting the complete movement of the face plate throughout the aforesaid orbit.

37. A razor comprising a body portion incorporating a guard, an element pivotally connected to the body portion and including a face plate that is swingable with said element between a position in confronting relation to the guard and a position to one side and to the rear thereof to fully expose the guard, actuating means carried by the body portion for imparting movement to said member through a definite and fixed orbit of travel relative to the body portion, a blade adapted to be applied to the guard when exposed and to be disposed between the face plate and guard when they are in confronting relation, and blade pick-up means for initially attaching the blade to the guard while the latter is exposed preparatory to moving the face plate into confronting relation therewith.

38. A razor comprising a post, a handle rotatably mounted on one end of the post, a guard carried by the opposite end of the post, a sleeve encircling the post and handle and having screw thread connection with the latter so as to be moved longitudinally of the post upon rotation of the handle, said sleeve having opposed cheeks extending from its end toward the guard on opposite sides of and in spaced relation to the post, a structure having at one end portions that are spaced apart and are disposed between the opposite sides of the post and the adjacent cheeks, means pivotally connecting said portions to the cheeks, said portions having slots, pivotal means extending from the post into said slots, a face plate carried by the free end of said structure and adapted to be moved therewith toward and from the guard in confronting relation thereto and swingable therewith out of confronting relation to the guard and to the rear thereof, and a blade adapted to be disposed between the face plate and guard when they are in confronting relation.

39. In combination, a razor body, a plurality of blades with each of which the razor body is capable of having a slip joint connection, said connection yielding to force incident to the application or withdrawal of the blade, means for holding a plurality of blades in side-to-side arrangement and in such manner that the end one of said plurality of blades is in a position to be applied to the razor body by the application of the latter thereto, a receiver for the blades, and stripper means associated therewith for removing the blades from the razor body.

40. A razor comprising a body portion incorporating a handle and a guard, an element slidably and swingably carried by the body portion and including a face plate that is movable with said element toward and from the guard in confronting relation thereto and is swingable with said element to one side of the guard so as to fully expose the guard and leave it unobstructed for the application of a blade thereto, means carried by and movable longitudinally of the handle for sliding the element, operative connections between the element and handle for imparting the swinging movement to the element due to continued longitudinal movement of said means, and a blade adapted to be disposed between the face plate and the guard when they are in confronting relation.

In testimony whereof, I hereunto affix my signature.

LEE S. CHADWICK.